US008843273B2

(12) United States Patent
Wesling et al.

(10) Patent No.: US 8,843,273 B2
(45) Date of Patent: Sep. 23, 2014

(54) BICYCLE SUSPENSION

(71) Applicants: Kevin J. Wesling, Lombard, IL (US);
Russell Rose, Manitou Springs, CO (US); James Meyer, Spearfish, SD (US); Jeremiah Boobar, Colorado Springs, CO (US)

(72) Inventors: Kevin J. Wesling, Lombard, IL (US);
Russell Rose, Manitou Springs, CO (US); James Meyer, Spearfish, SD (US); Jeremiah Boobar, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 269 days.

(21) Appl. No.: 13/625,080

(22) Filed: Sep. 24, 2012

(65) Prior Publication Data

US 2014/0088828 A1      Mar. 27, 2014

(51) Int. Cl.
| B60G 17/018 | (2006.01) |
| B60G 23/00 | (2006.01) |
| B62C 3/00 | (2006.01) |
| B62K 25/00 | (2006.01) |
| G06F 17/00 | (2006.01) |
| G06F 19/00 | (2011.01) |
| G06F 7/00 | (2006.01) |

(52) U.S. Cl.
USPC ............................................. 701/37; 280/276

(58) Field of Classification Search
USPC ................ 280/284, 283, 276, 275, 279, 220;
188/282.4, 322.15; 701/52, 51, 37;
267/64.25
See application file for complete search history.

(56) References Cited

U.S. PATENT DOCUMENTS

| 5,921,572 | A | * | 7/1999 | Bard et al. ..................... 280/284 |
| 5,971,116 | A | * | 10/1999 | Franklin ..................... 188/282.4 |
| 6,050,583 | A | * | 4/2000 | Bohn ............................. 280/283 |
| 6,073,736 | A | * | 6/2000 | Franklin .................. 188/322.15 |
| 6,149,174 | A | * | 11/2000 | Bohn ............................... 424/49 |
| 6,543,799 | B2 | * | 4/2003 | Miyoshi ........................ 280/283 |
| 6,595,537 | B2 | * | 7/2003 | Miyoshi ........................ 280/283 |
| 6,612,599 | B2 | * | 9/2003 | Miyoshi ........................ 280/283 |
| 6,619,684 | B2 | * | 9/2003 | Miyoshi ........................ 280/283 |
| 6,688,626 | B2 | * | 2/2004 | Felsl et al. ..................... 280/275 |
| 6,698,780 | B2 | * | 3/2004 | Miyoshi ........................ 280/276 |
| 6,863,291 | B2 | * | 3/2005 | Miyoshi ........................ 280/283 |
| 7,182,358 | B2 | * | 2/2007 | Felsl et al. ..................... 280/283 |
| 7,255,359 | B2 | * | 8/2007 | Felsl et al. ..................... 280/279 |
| 7,552,935 | B2 | * | 6/2009 | McAndrews ................. 280/283 |
| 7,581,743 | B2 | * | 9/2009 | Graney ......................... 280/284 |
| 7,784,810 | B2 | * | 8/2010 | Graney ......................... 280/284 |
| 7,837,213 | B2 | * | 11/2010 | Colegrove et al. ............ 280/284 |
| 8,121,757 | B2 | * | 2/2012 | Song et al. ...................... 701/37 |
| 8,235,409 | B2 | * | 8/2012 | Colegrove et al. ............ 280/284 |
| 8,342,552 | B1 | * | 1/2013 | Zimmerman ................. 280/220 |
| 8,386,127 | B2 | * | 2/2013 | Song et al. ...................... 701/37 |
| 8,429,061 | B2 | * | 4/2013 | Shirai ............................. 705/37 |
| 8,458,080 | B2 | * | 6/2013 | Shirai ............................. 705/37 |
| 8,489,277 | B2 | * | 7/2013 | Hara et al. ...................... 701/37 |

(Continued)

FOREIGN PATENT DOCUMENTS

EP          2200893         6/2010

*Primary Examiner* — Thomas G Black
*Assistant Examiner* — Robert Payne
(74) *Attorney, Agent, or Firm* — Milan Milosevic; Lisa Serdynski; Steven Courtright

(57) ABSTRACT

A control system for adjusting suspension settings of a bicycle, including a bicycle sensor configured to sense a coasting condition and a non-coasting condition and generate input signals indicative of the sensed condition, and a control unit in communication with the bicycle sensor and configured to generate output signals in response to the input signals, the output signals receivable by the bicycle suspension to selectively adjust the suspension settings.

30 Claims, 15 Drawing Sheets

(56) References Cited

U.S. PATENT DOCUMENTS

| | | | |
|---|---|---|---|
| 8,489,278 B2* | 7/2013 | Song et al. | 701/37 |
| 8,608,141 B2* | 12/2013 | Fox | 267/64.25 |
| 8,655,548 B2* | 2/2014 | Ichida et al. | 701/37 |
| 8,755,969 B2* | 6/2014 | Ichida et al. | 701/37 |
| 8,781,679 B2* | 7/2014 | Ikemoto | 701/37 |
| 8,781,680 B2* | 7/2014 | Ichida et al. | 701/37 |
| 2001/0030408 A1* | 10/2001 | Miyoshi | 280/276 |
| 2003/0094783 A1* | 5/2003 | Miyoshi | 280/283 |
| 2003/0094784 A1* | 5/2003 | Miyoshi | 280/284 |
| 2003/0132600 A1* | 7/2003 | Miyoshi | 280/276 |
| 2003/0132601 A1* | 7/2003 | Miyoshi | 280/276 |
| 2003/0132602 A1* | 7/2003 | Miyoshi | 280/276 |
| 2006/0064223 A1* | 3/2006 | Voss | 701/52 |
| 2009/0088934 A1* | 4/2009 | Takebayashi | 701/51 |
| 2009/0192673 A1* | 7/2009 | Song et al. | 701/37 |
| 2010/0010709 A1* | 1/2010 | Song | 701/37 |
| 2010/0276906 A1* | 11/2010 | Galasso et al. | 280/283 |
| 2011/0095507 A1 | 4/2011 | Plantet | |
| 2011/0109060 A1 | 5/2011 | Earle | |
| 2011/0202236 A1* | 8/2011 | Galasso et al. | 701/37 |
| 2011/0202266 A1 | 8/2011 | Downs | |
| 2011/0257841 A1* | 10/2011 | Hara et al. | 701/37 |
| 2012/0130591 A1* | 5/2012 | Song et al. | 701/37 |
| 2012/0221203 A1* | 8/2012 | Ichida et al. | 701/37 |
| 2012/0221204 A1* | 8/2012 | Ichida et al. | 701/37 |
| 2012/0221205 A1* | 8/2012 | Ichida et al. | 701/37 |
| 2013/0138295 A1* | 5/2013 | Song et al. | 701/37 |
| 2013/0144489 A1* | 6/2013 | Galasso et al. | 701/37 |
| 2013/0338876 A1* | 12/2013 | Oldenettel et al. | 701/37 |

* cited by examiner

US 8,843,273 B2

BICYCLE SUSPENSION

BACKGROUND OF THE INVENTION

The invention relates to bicycles and more particularly, to a bicycle suspension system having a sensor for use in controlling the state of a bicycle suspension component or system.

"Mountain biking" is a relatively new bicycling sport where enthusiasts experience riding off road and mountain trails, for instance. Bicycles specifically designed for that terrain, often called "mountain bikes," while individually diverse, typically have some universal commonalities, namely some sort of a suspension component or system for addressing the terrain over which the bicycle is designed to travel.

In addition to the bicycle frame, wheels, and tires, which tend to provide some functionality related to the comfort of the rider, the ride performance of a mountain bike also may rely on one or more of several types of active suspension systems: a front wheel suspension system, a rear wheel suspension system, and more recently, a seat post suspension or seat post adjustable ride height system. Historically, when a rider wanted to change the functionality of any of the suspension systems, she might reach down and twist a knob located on a component of the front suspension system and/or the rear suspension system. Of course, it is impractical while riding to reach to a control located on the bicycle fork or rear suspension component. Other means of adjusting suspension function includes the user adjusting the component with a tool while dismounted from the bicycle and while the bicycle is at rest.

Suspension components and systems function to smooth and/or steady the motion of the bicycle frame as it travels over uneven terrain, which permits the wheels to move up or down to conform to the topography at that location and maximizes the traction of the tires by maintaining contact with the ground. However, during pedaling, the suspension can contribute to the tendency of the bicycle frame to move up and down, and in some cases can add to the amount of bouncing experienced by the rider, which tends to decrease pedaling efficiency and decrease the ability of the rider to control the bicycle.

Therefore, there is a need to provide a means of controlling the motion of the suspension effectively. The invention satisfies the need.

BRIEF SUMMARY OF THE INVENTION

In light of the present need for an improved bicycle suspension, a brief summary of exemplary embodiments of the invention is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections, but it should be understood that minor variations of these concepts are contemplated by the invention, and in particular those variations within the grasp of one with ordinary skill in the art.

One aspect of the invention provides a control system for adjusting suspension settings of a bicycle, including a bicycle sensor configured to sense a coasting condition and a non-coasting condition and generate input signals indicative of the sensed condition, and a control unit in communication with the bicycle sensor and configured to generate output signals in response to the input signals, the output signals receivable by the bicycle suspension to selectively adjust the suspension settings.

These and other features and advantages of the present invention will be more fully understood from the following description of one or more embodiments of the invention, taken together with the accompanying drawings.

DETAILED DESCRIPTION OF THE INVENTION

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "front" and "rear," or "left" and "right" are used for the sake of clarity and not as terms of limitation. Moreover, the terms refer to bicycle mechanisms conventionally mounted to a bicycle and with the bicycle oriented and used in a standard fashion unless otherwise indicated.

Figure 1:
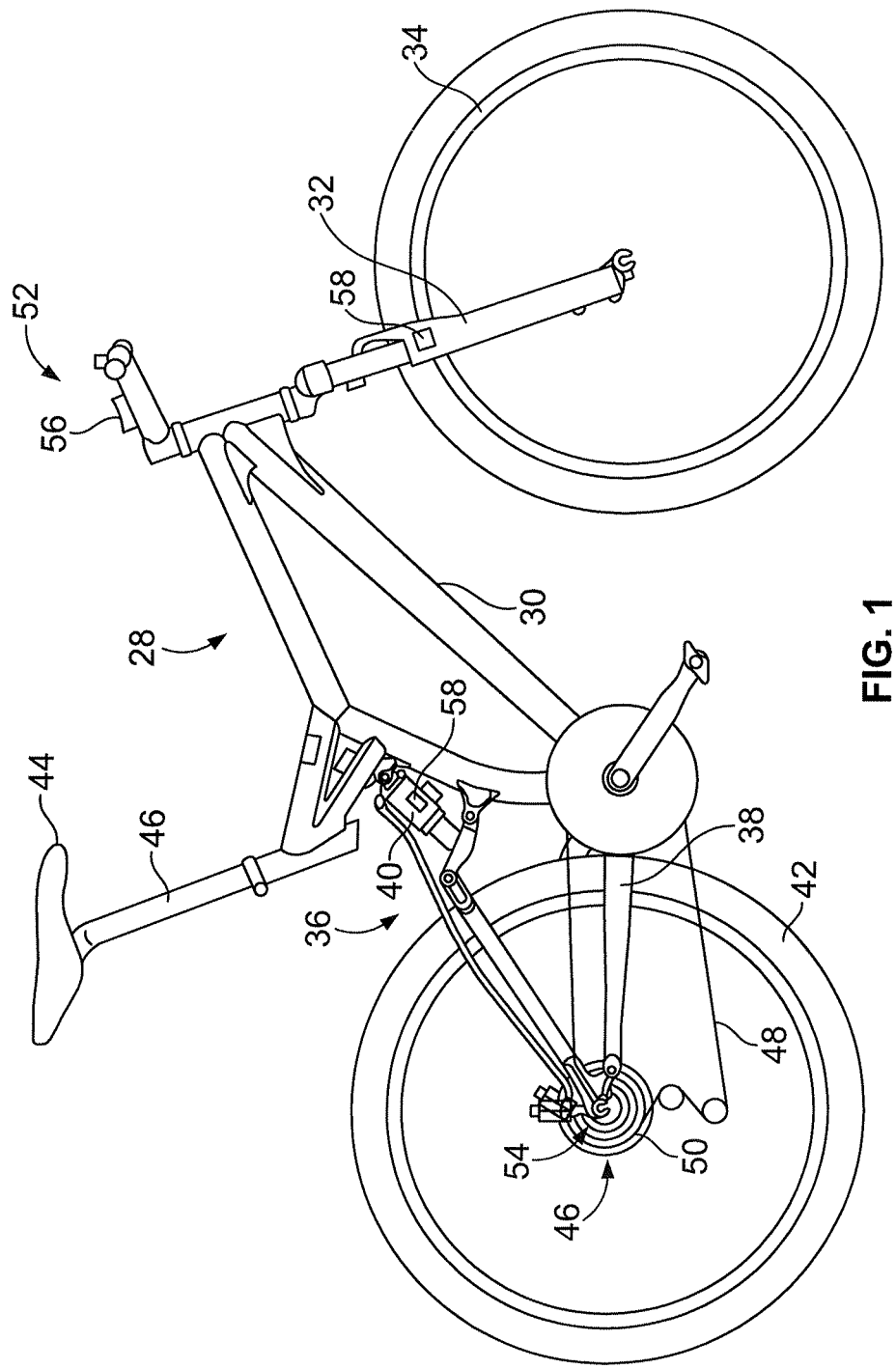
FIG. 1 is a bicycle shown in a side view including a bicycle suspension system according to one embodiment of the invention.

FIG. 1 shows a bicycle 28 with a bicycle frame 30. A front fork 32 or front suspension component is attached to the frame 30 and a front wheel 34 is removably attached to the front fork. The front fork 32 may be a suspension-style telescoping fork. The front fork 32 controls relative motion between the front wheel 34 and frame 30.

The frame 30 may include an optional rear suspension assembly 36 including a rear swing arm 38 and rear suspension component including a rear shock absorber 40. A rear wheel 42 is held in the rear swing arm 38. The rear swing arm 38 and rear shock absorber 40 control relative motion between the rear wheel 42 and frame 30. The rear suspension assembly 36 may also be referred to as the rear suspension. One or both of the front fork 32 and rear suspension 36 may be considered to comprise the bicycle suspension.

A saddle 44 is connected to the frame 30 by a seat post 46. The rear wheel 42 is built on a hub 46 as is well known. The rear wheel 42 is driven by chain 48, which is rotated on chainrings by a user. The chain 48 is disposed on sprockets 50 of the hub 46, to turn the rear wheel 42.

The bicycle 28 includes a control system 52, which is configured to sense the state of the bicycle and provide control input to one or both of the front fork 32 and rear shock absorber 40. Generally, in the present embodiment, the control system 52 includes a bicycle sensor 54 that is capable of detecting when the bicycle 28 is in a state of coasting or non-coasting, a control unit 56 including one or more microprocessor for processing input signals from the sensor, and may also include one or more actuator 58 responsive to output signals generated by and from the control unit 56. The one or more actuator 58 may be respectively operatively connected to either or both of the front and rear suspension 32, 40. Details of the components (54, 56, and 58) of the bicycle suspension control system 52 will be found hereinbelow.

Figure 2B:
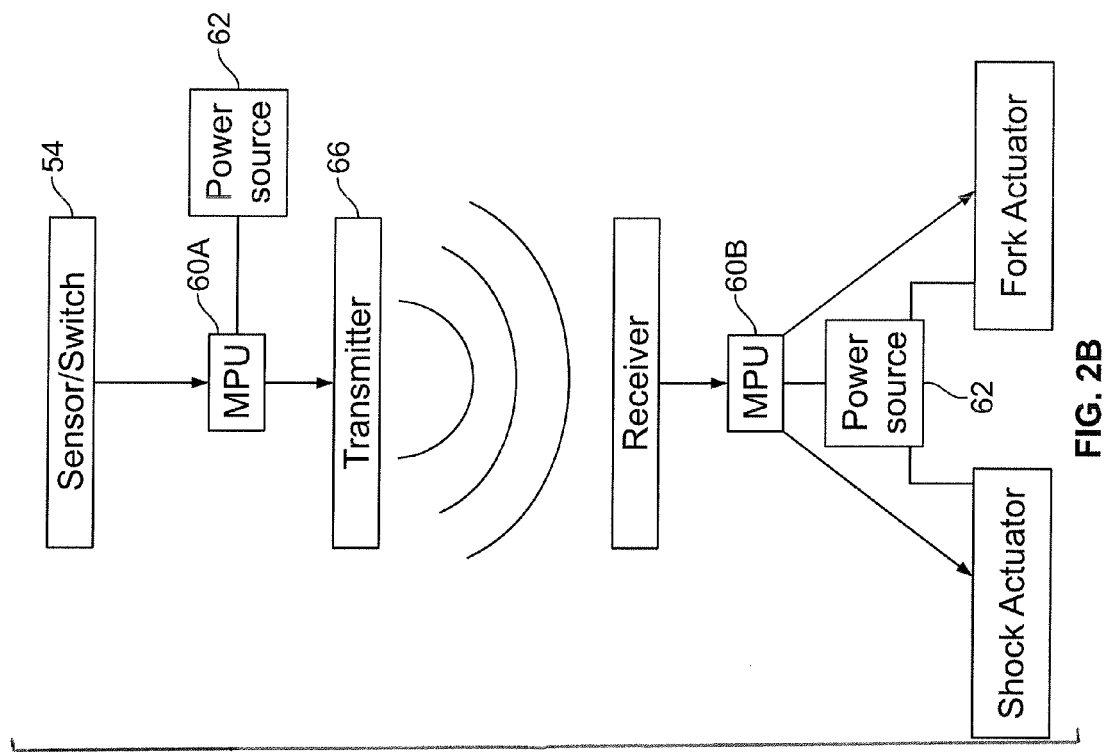
FIGS. 2A and 2B is a bicycle suspension system according to one embodiment of the invention.
Figure 2A:
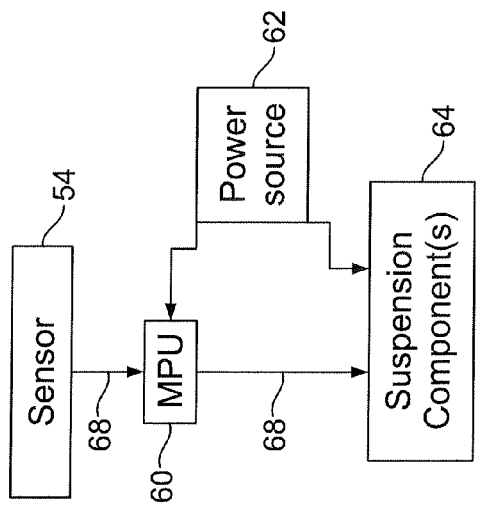

Turning to FIGS. 2A and 2B, details of embodiments of the invention are shown. In its most basic form, the invention is a control system 52 for adjusting suspension settings of a bicycle suspension that includes one or more sensor 54 configured to sense relative motion between the drivetrain or a drivetrain component (e.g., chain 48 and/or sprockets 50), and the wheel 42, and a control unit 56 having a microprocessor, (one or more microprocessor (MPU), logic circuit or CPU) that uses information from the sensor to make desired changes in the suspension settings of, for example, one or both of the front and rear suspension components 32, 40 (FIG. 1). The control unit 56 may be a single, centralized component or may be multiple processor components located in different places in the system 52.

A sensor 54 of the control system 52 is shown. The sensor 54 may be any suitable sensor or combinations thereof, including but not limited to a switch, a reed switch, a pressure sensor, a magnetic sensor, an optical sensor, a torque or strain sensor, a hall-effect sensor, and an acoustic sensor. The sensor 54 is positioned and configured to detect relative motion between one or more components of the drive train and the wheel 42. The sensor 54 may output analog or digital signals.

A microprocessor 60 part of the control unit 56 is in wired or wireless communication with the sensor 54 to receive input signals indicative of the sensed condition from the sensor and is configured to generate an output signal in response to the input signals. In one example, the microprocessor 60 may convert analog signals from the sensor 54 to a digital signal. The microprocessor 60 may also be one or more microprocessor, logic circuit or CPU, for example, or an equivalent electronic device.

The microprocessor 60 of FIG. 1 and microprocessors 60A, 60B and transmitter/receiver parts 66, 70 of FIG. 2 can be conventional microcontroller and conventional wireless transmitter/receiver components. In some instances, wired communication may be substituted for the wireless communication shown in FIG. 2B, for example. It is believed that one of ordinary skill in the art would be able to program a conventional microcontroller or microprocessor to produce the desired output for operating the actuators with appropriate drivers and so on without having to exercise an undue amount of experimentation to accomplish the task. In a similar fashion, it is believed that application of wired connections 68 or wireless communication can be performed by one with ordinary skill in the art without undue experimentation.

A power source 62 is provided to one or both of the sensor 54 and the microprocessor 60 or 60A. The power source 62 may be a battery or generator, for example.

The microprocessor 60A may be in communication with a wireless transmitter 66 or a wired connection 68 to convey signals via to either of a receiver 70 or a microprocessor 60B for the one or more actuators 64A, 64B. In an alternative embodiment, the microprocessor 60A communicates wirelessly or by a wired connection directly with the one or more actuators 64A, 64B. The microprocessor 60 may be centralized into a discrete control unit module (60, FIG. 1) or distributed amongst one or more of the various components of the bicycle suspension control system 52 (60A, 60B, FIG. 2B).

The invention may include one or more actuator 64A for the front fork 32, such as, for example, an electric motor that is in communication with the microprocessor 60A or 60B. The actuator 64A is configured to effect changes in the suspension settings of the front fork 32 by performing, for example, a change in one of lockout state, travel amount, or damping rate, for example.

The actuator 64B for the rear shock 40 may be an electric motor that is connected to the microprocessor 60A or 60B. The actuator 64B is configured to effect changes in suspension settings of the rear shock 40 by performing, for example, a change in one of lockout state, travel amount, or damping rate. How lockout state, travel amount, or damping rate is changed is well-known, but generally may involve changes in valve operation, for example, of the suspension component.

A source of power 62 is provided for actuators 64A, 64B and the optional second microprocessor 60B, depending on the embodiment, i.e., depending on the number of processors and actuators used. The power source 62 may be a battery or generator, for example.

It will be understood that the systems depicted in FIGS. 2A, 2B are illustrative in nature and not necessarily arranged strictly and/or grouped as shown. The components of the bicycle suspension control system 52 may be positioned, grouped, and/or arranged in any suitable manner.

For example, referring to FIG. 2B, the following components: sensor 54, microprocessor 60A, power source 62 and transmitter 66 may be housed together, while each of the actuators 64A, 64B may each be packaged with a receiver 70, microprocessor 60B and power source 62. Alternatively, power source 62 may be a power generator located within the sensor assembly that draws power during the relative motion of the drivetrain and the wheel 42.

Figure 3:
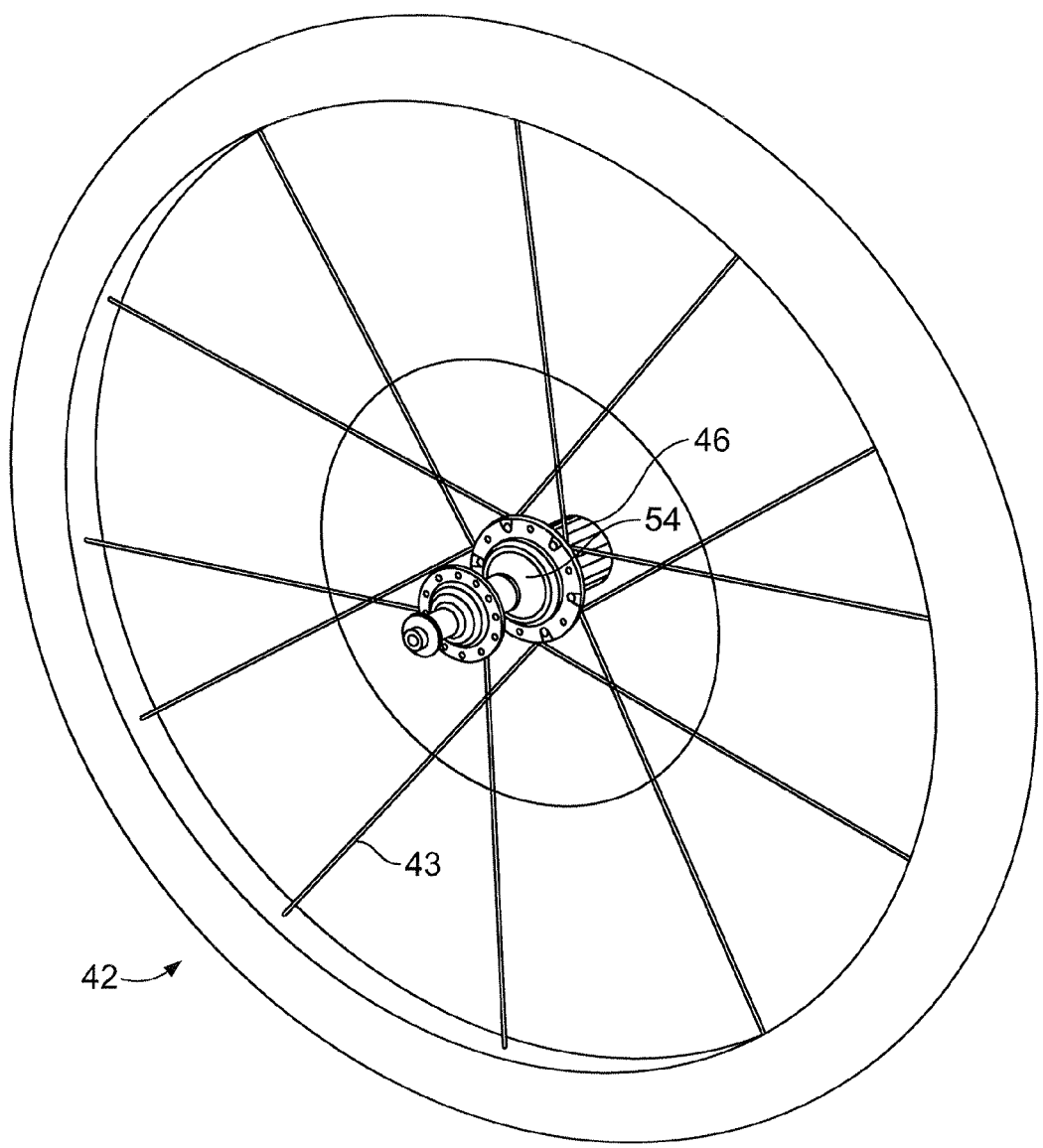
FIG. 3 is a perspective view of a rear wheel and hub of the bicycle.

FIG. 3 shows a rear wheel 42 and hub 46. The hub 46 is positioned centrally in the wheel 42 and suspended in position by a plurality of spokes 43 as is well known. In one or more embodiments of the invention, a sensor 54 is disposed in or on the hub 46, or a nearby part, and detects whether the drivetrain is moving relative to the hub 46.

Figure 4:
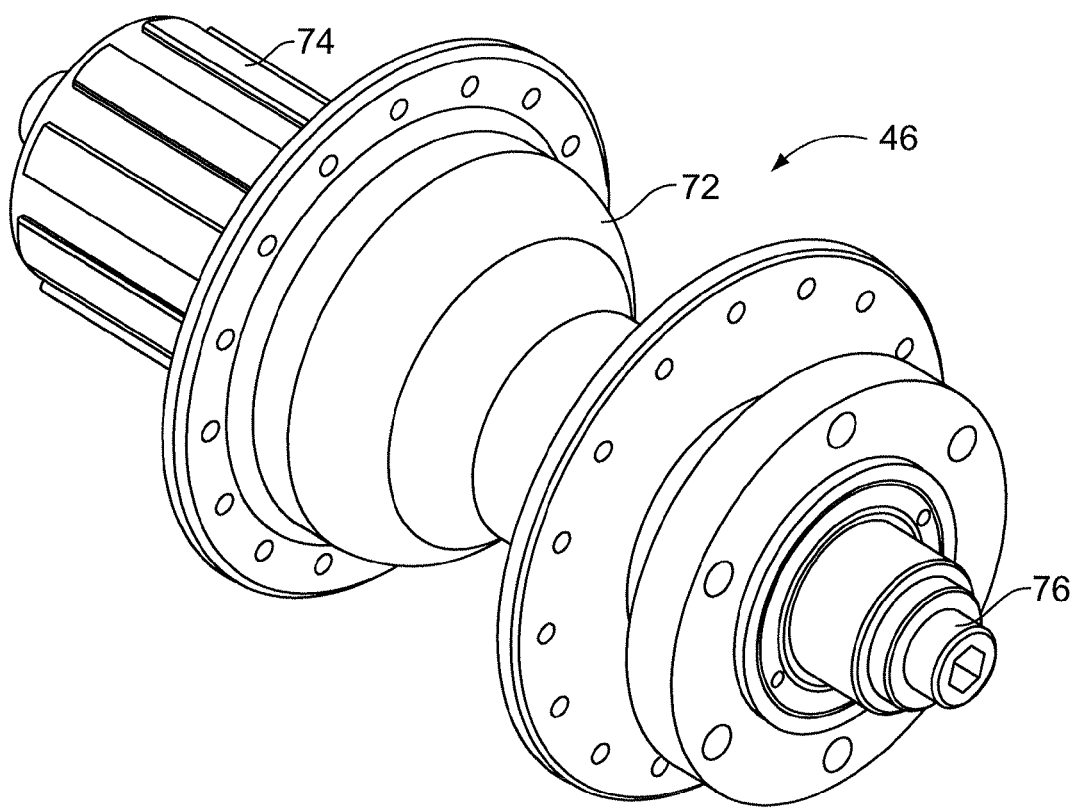
FIG. 4 is a perspective view of the rear hub of the bicycle.

FIG. 4 is a close up view of the hub 46 of FIG. 3. The main parts of the hub 46 viewable in the figure are a hub shell 72, a freehub body, driver or driver body 74 attached to the hub shell, and an axle 76 disposed in the hub. The driver body 74 is fixably connected to the drivetrain gears/sprockets 50 (not shown).

Figure 5:
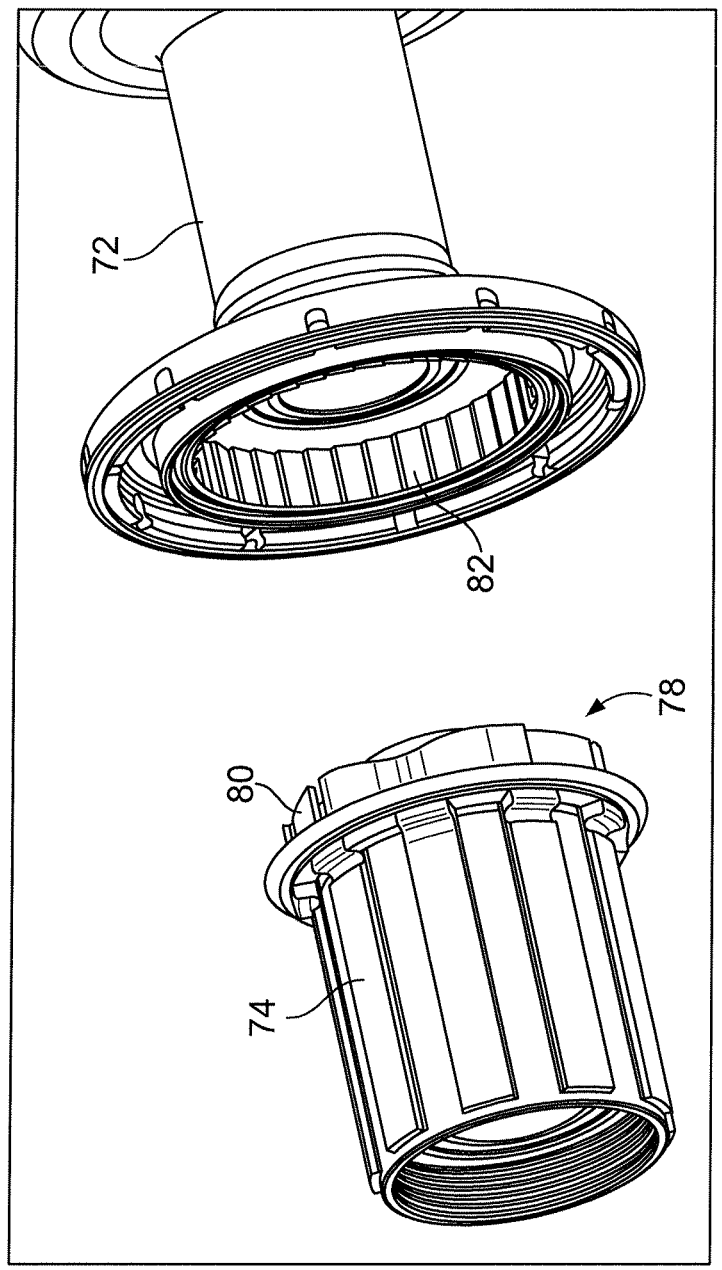
FIG. 5 is a perspective view of a rear hub with the driver body removed to expose a one-way clutch.

FIG. 5 is an exploded view of the hub 46 of FIG. 4, with the driver 74 detached from the hub shell 72. Disposed between the driver 74 and shell 72 is a one-way clutch 78. In this embodiment of a one-way clutch 78, one or more pawl 80 is arranged on the driver 74 in position to radially engage a ratchet 82, which is disposed in the hub shell 72 when the driver 74 is connected to the shell 72. When the bicycle is being propelled by the user, the one-way clutch 78 drivingly connects the driver 74 and shell 72, and there is no relative motion between the driver and shell, which corresponds to a non-coasting condition. When the bicycle is coasting, the shell 72 rotates with the wheel 42 (FIG. 1), and the driver 74 does not rotate or rotates slower than the shell so there is relative motion between the shell 42 and the driver 74. Accordingly, in this embodiment, the invention may employ a sensor 54 to detect when there is relative motion between the driver 74 and shell 72, which corresponds to a coasting condition.

Figure 6:
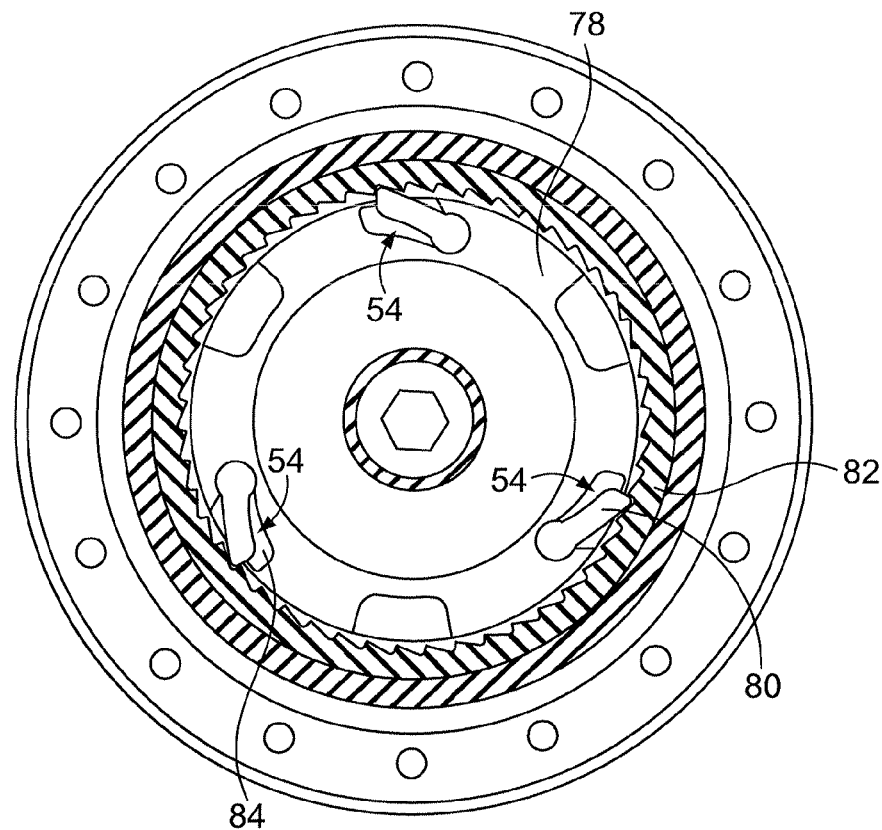
FIG. 6 is a side view of the one way clutch of the hub of FIG. 5.

FIG. 6 shows an assembled one-way clutch 78 with the pawls 80 engaged with the ratchet 82. The illustrated condition of the clutch 78 corresponds to a driving, propelling, or non-coasting condition or state. In this state, the pawls 80 are extended from pawl recesses 84. Sensors 54 are disposed as detailed in FIGS. 7A and 7B.

Figure 7A:
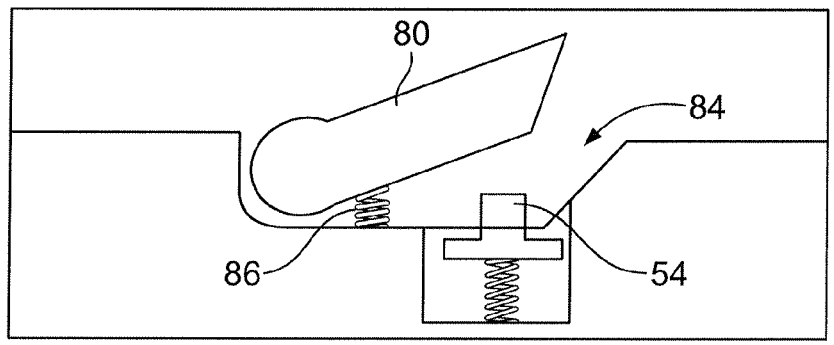
FIGS. 7A and 7B are diagrams of a coast sensor operatively disposed to be responsive to the one way clutch of FIG. 6.
Figure 7B:
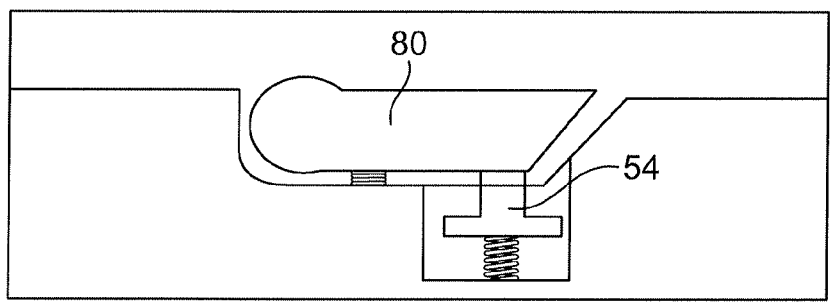

FIG. 7A is a diagram showing part of a one-way clutch with a pawl 80 biased by a pawl spring 86 to an extended condition out of recess 84, and corresponding to a non-coasting condition. A sensor 54 may be disposed in the recess 84 and underneath the pawl 80. The sensor 54 may be a pressure sensor that detects the position of or contact with the pawl 80 when the pawl is forced into the recess 84 as shown in FIG. 7B, corresponding to a coasting condition. It will be understood that in the coasting condition, the hub shell 72 rotates (with the wheel 42) and the driver body 74 does not rotate with the hub shell. During coasting, the pawl 80 may move in and out of recess 84 at a frequency dependent upon the frequency of teeth passing of the ratchet 82. Thus, the pawl 80 may cause the sensor 54 to be actuated and then non-actuated at a frequency. Accordingly, in this instance, the signal generated by the sensor 54 will reflect the particular frequency. In the case of an audio sensor the signal will similarly reflect the sound made by the pawl during coasting which is generally a clicking sound as the pawl 80 passes over ratchet wheel teeth. It will be understood that different sensors will generate different specific signals, which will be received and analyzed by the control unit according to the source and method of generating the signal.

Figure 8:
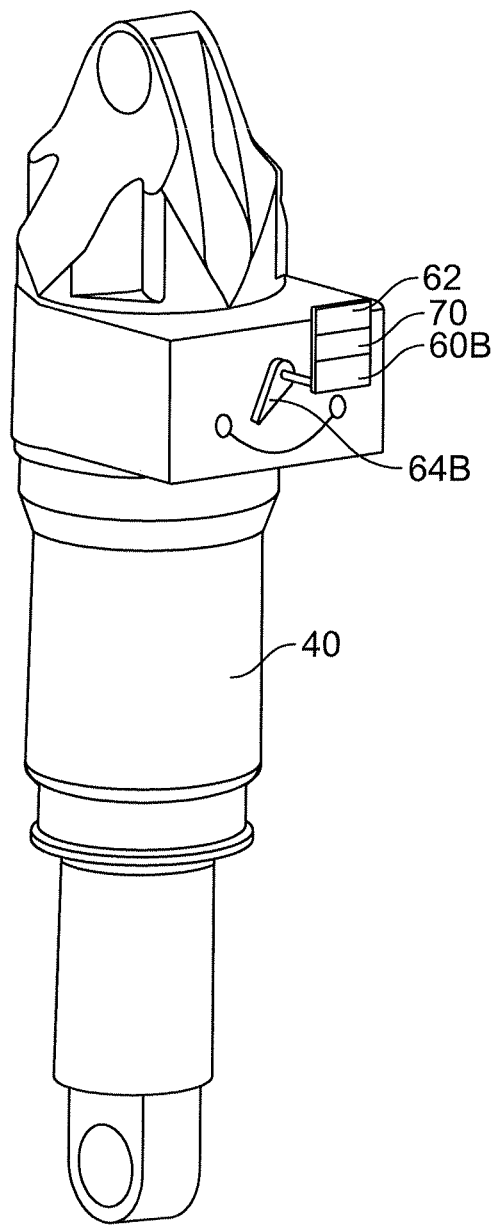
FIG. 8 is a rear suspension component including a shock absorber of the bicycle including an actuator according to an embodiment of the invention.

FIG. 8 shows a rear shock absorber 40 unit according to one embodiment of the invention. In this embodiment, the rear shock absorber 40 includes a receiver 70, for receiving signals from transmitter 66 (FIG. 2). The receiver 70 communicates with the microprocessor 60B. One or more source of power 62 powers the receiver 70, microprocessor 60B and the actuator 64B. The actuator 64B may be a motor that causes changes in the function of the shock absorber 40, by changing damping rates, engaging or disengaging a lockout feature or any desired change.

Figure 9:
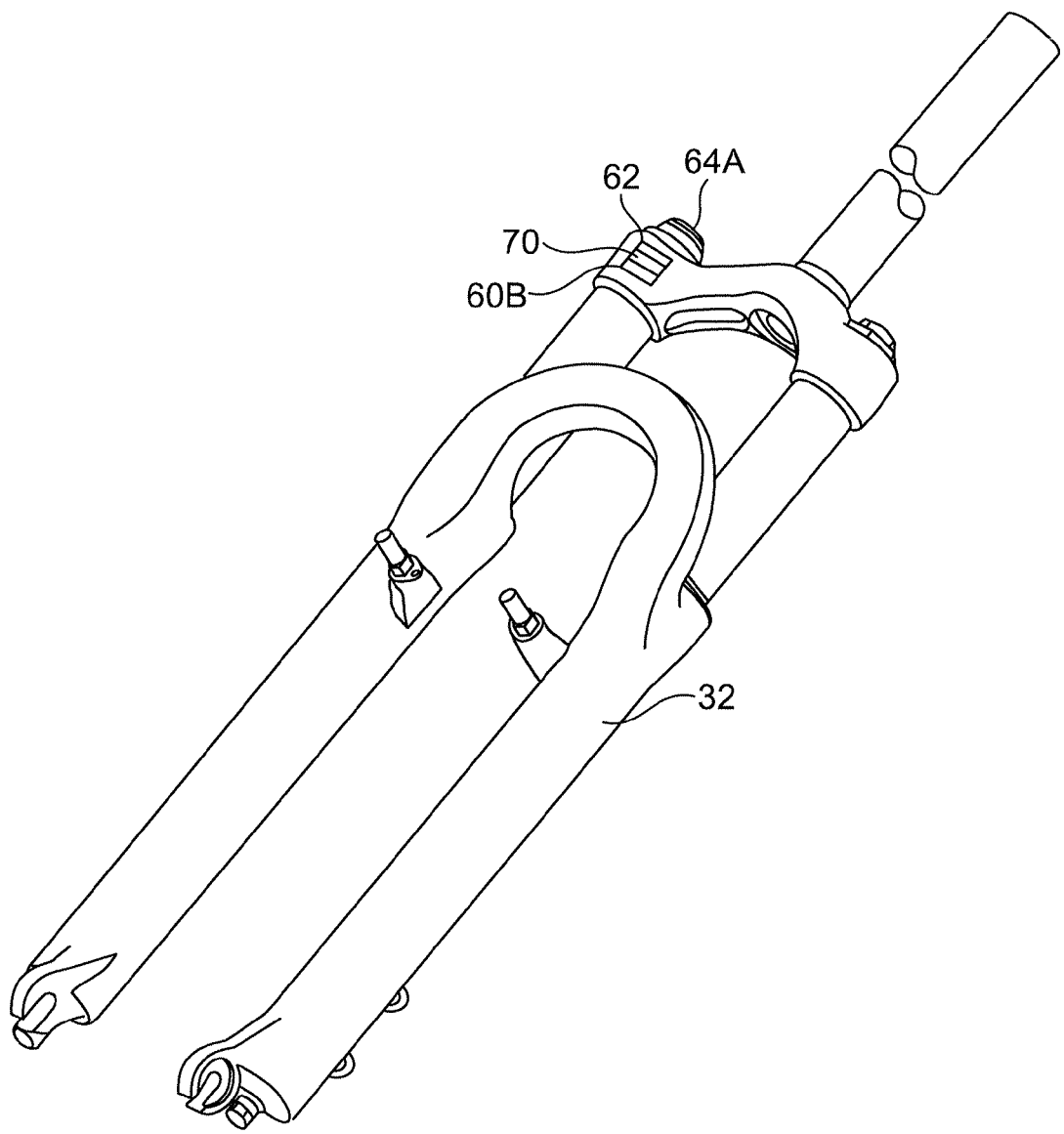
FIG. 9 is a front suspension component including a suspension fork of the bicycle including an actuator according to another embodiment of the invention.

FIG. 9 shows a front suspension fork 32 according to another embodiment of the invention. In this embodiment, the front suspension fork 32 includes a receiver 70, for receiving signals from the transmitter 66 (FIG. 2). The receiver 70 communicates with the microprocessor 60B. One or more source of power 62 powers the receiver 70, microprocessor 60B and the actuator 64A. The actuator 64A may be a motor that causes changes in the function of the front suspension fork 32, by changing damping rates, engaging or disengaging a lockout feature or any desired change.

In order to detect whether coasting is occurring or not, the sensor 54 may be positioned between the hub shell 72 and driver 74 because relative motion of the hub shell and the driver may be used to indicate coasting. For example, when the bicycle is moving and thus the wheel hub 46 is rotating, but active propulsion is not occurring, i.e., when at the same time the wheel 42 is rotating the driver 74 is not rotating, relative motion occurs between the wheel hub and the driver and this motion can be sensed in a number of ways.

Figure 10:
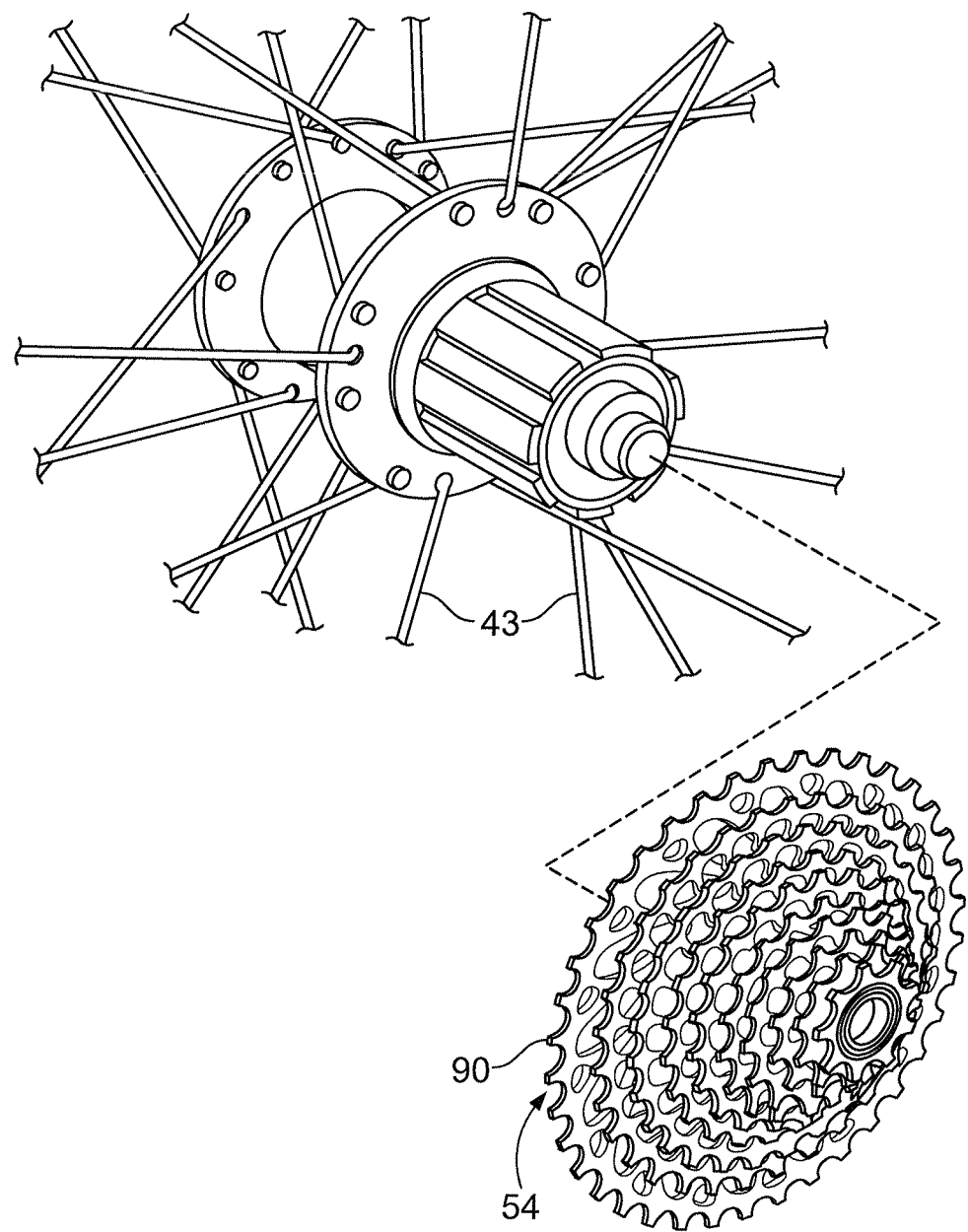
FIG. 10 is an exploded perspective view of a rear hub and cassette of the bicycle.
Figure 13:
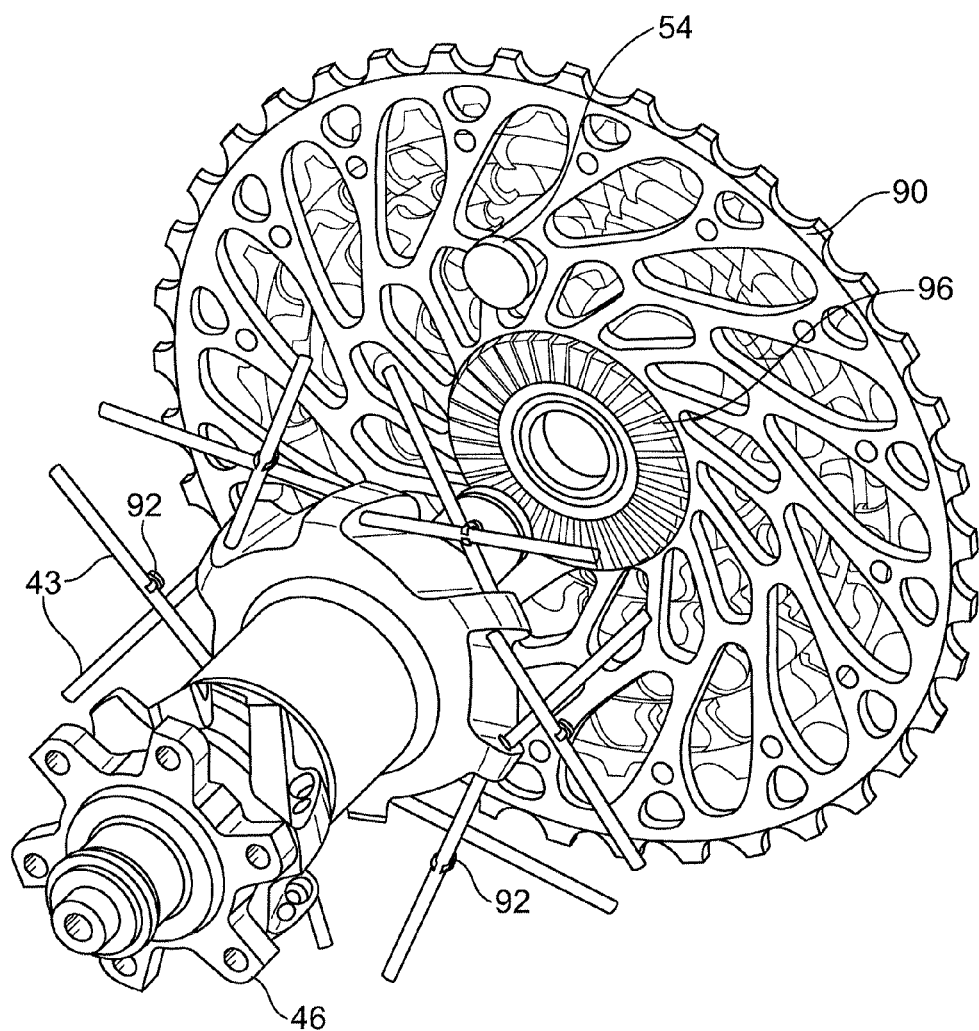
FIG. 13 is a perspective view of a rear hub and cassette of the bicycle with an axial one way clutch and coast sensor.
Figure 14:
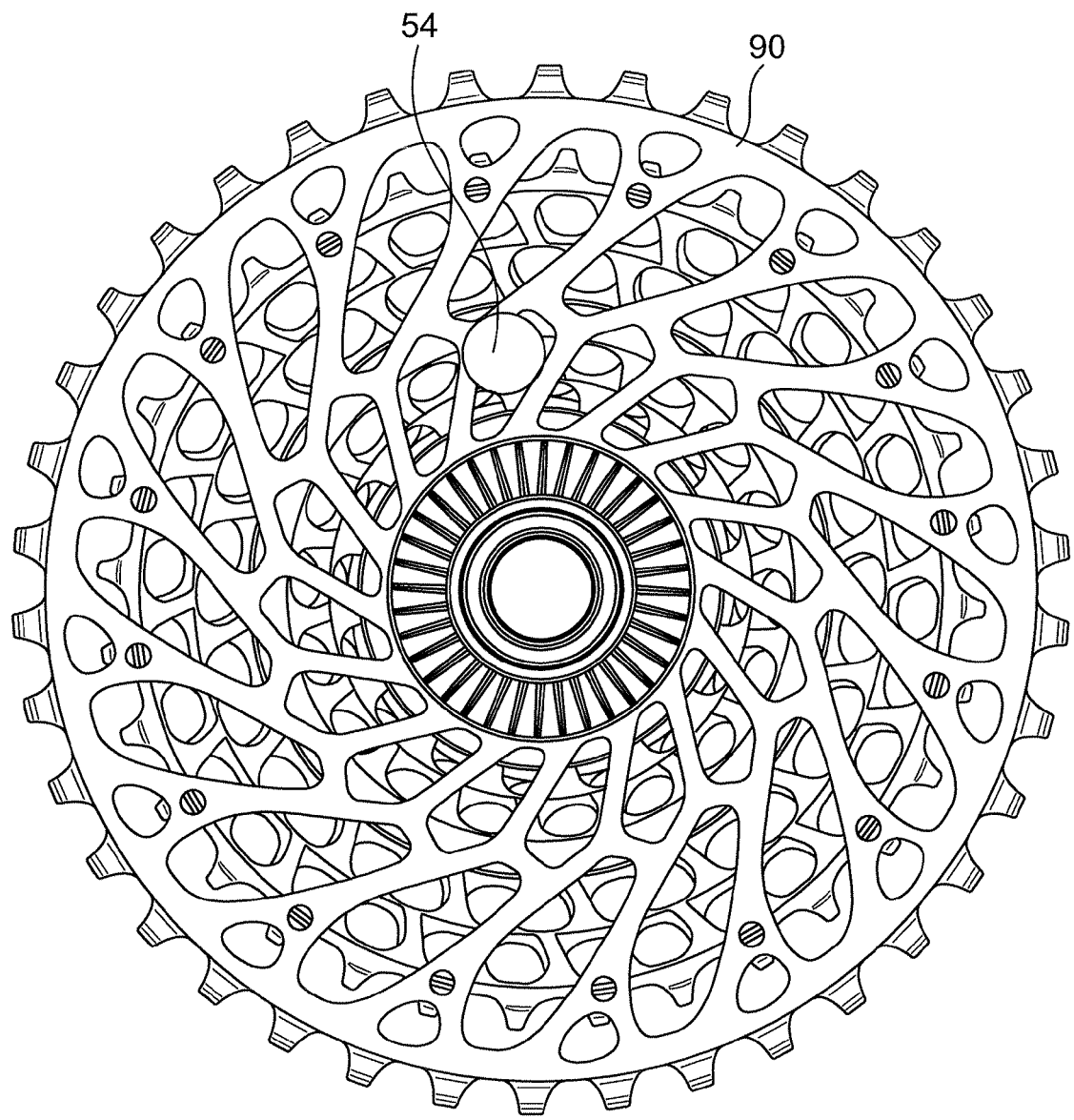
FIG. 14 is the cassette and sensor of FIG. 13.
Figure 15:
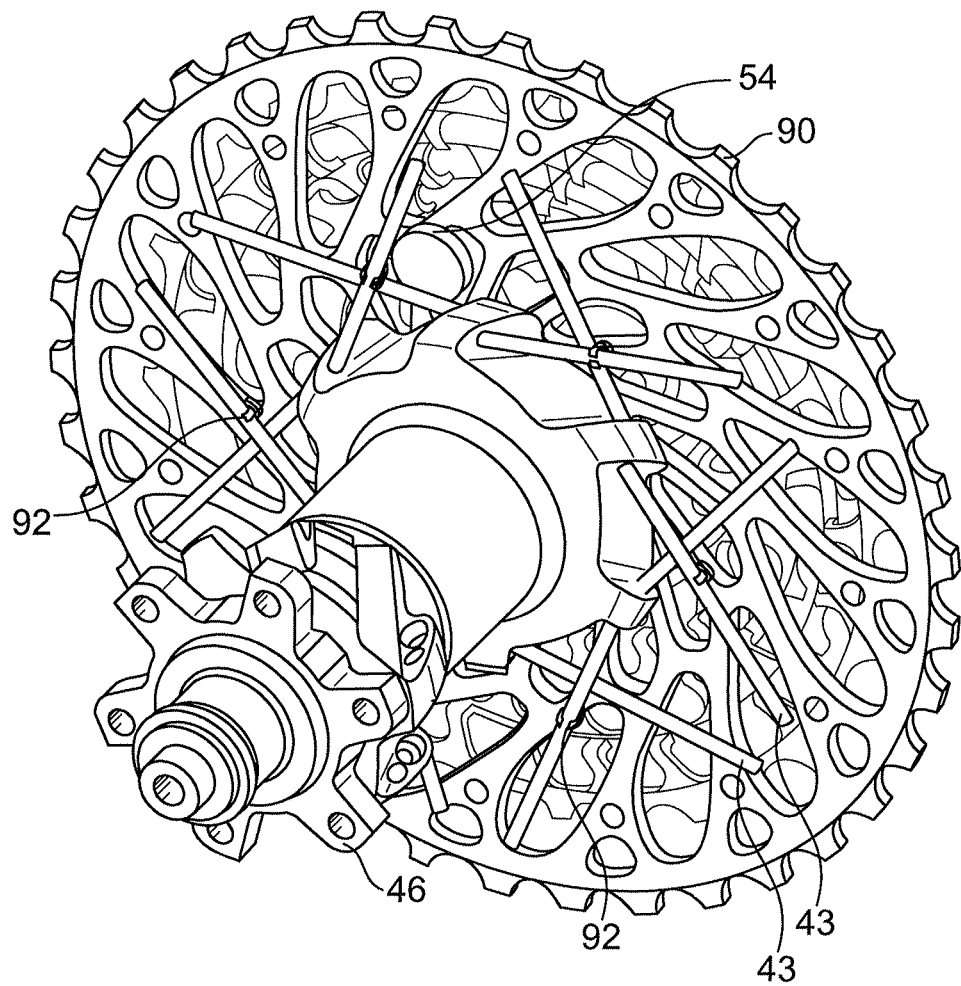
FIG. 15 is the rear hub and cassette of FIG. 10 in an assembled condition.

As in FIGS. 5-7, a sensor 54 can be attached to a cassette 90 as shown in FIGS. 10 and 13, and configured to detect coasting when the spokes 43 of the wheel 42 move relative to the cassette.

One example of the above arrangement is detailed in FIGS. 13-16. Hub 46 is provided with a plurality of spokes 43. One or more magnet 92 is affixed to the spokes 43. A plurality of magnets may be preferred to increase resolution of the system. A sensor 54, configured and positioned to detect the one or more magnets 92 is disposed on the cassette 90. The sensor 54 may be a reed switch, for example. If the wheel hub 46 is being propelled, the cassette 90 does not rotate relative to the wheel 42, and the magnet(s) 92 does not pass by the sensor. Thus, the sensor 54 does not detect the magnet and there is no change in state of the sensor.

Figure 11:
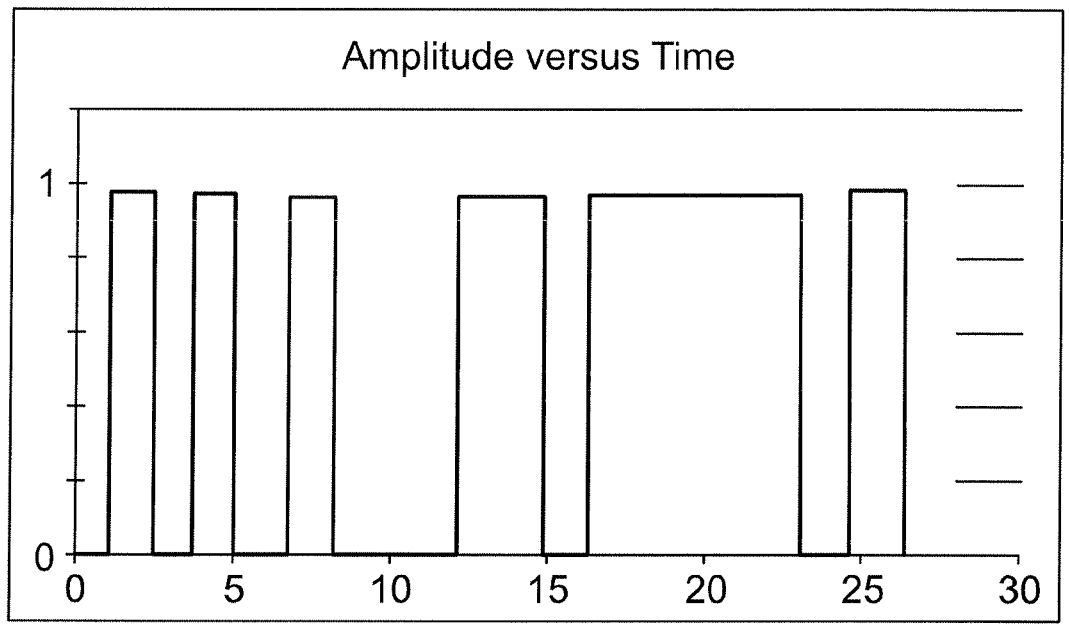
FIG. 11 is a graph illustrating the signal generated by a coast sensor according to an embodiment of the invention.
Figure 12:
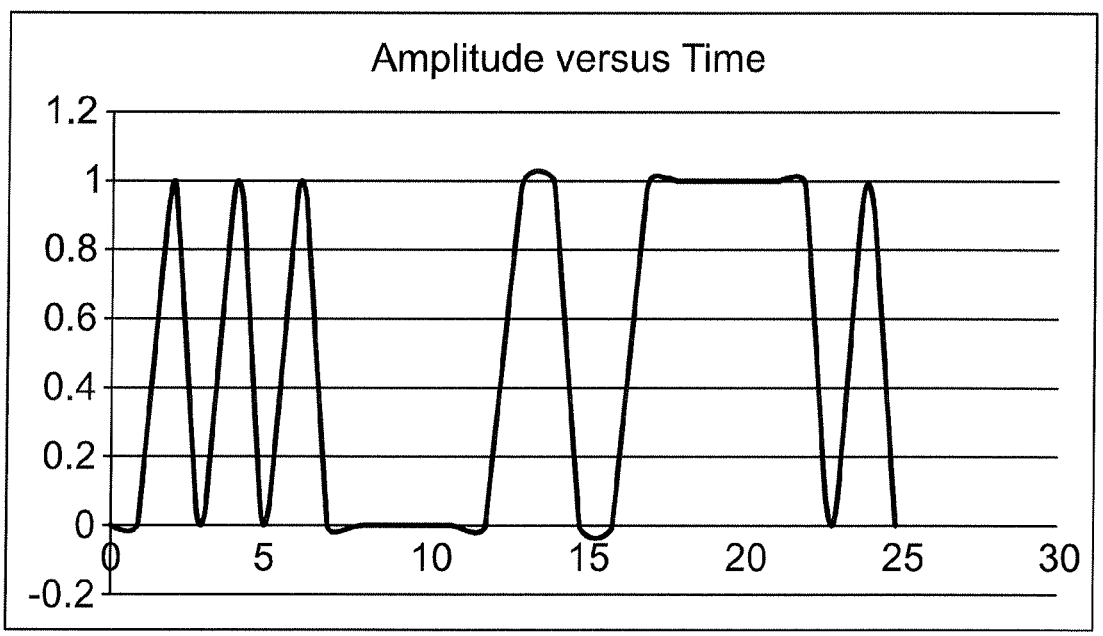
FIG. 12 is a graph illustrating the signal generated by a coast sensor according to another embodiment of the invention.

When coasting occurs, the magnet(s) 92 pass by and are sensed by the sensor 54 causing periodic changes in the state of the sensor. The detection of the magnet(s) 92 by the sensor 54 causes the generation of a signal indicative of a coasting condition. One example of a signal indicative of coasting is shown in FIG. 11, which may correspond to a digital signal of either zero or one depending on the state of the sensor switch. Another example of a signal indicative of coasting is shown in FIG. 12, which may correspond to an analog signal. It will be understood that a flat or constant curve would correspond to a condition that is not coasting, wherein either the bicycle is stationary or is being propelled such that the cassette and hub body have no relative rotation.

Another embodiment of the invention, using a type of hub/cassette shown generally in FIG. 13, comprises an axial clutch 102 with clutch parts located on the interface between the hub 46 and the cassette 90. Specifically, the hub 46 includes a first axial clutch part 98 comprising a toothed ring and the cassette includes a second axial clutch part 96 comprising a toothed ring shaped and positioned to engage the first axial clutch part in a driving direction, and disengage in a non-driving direction.

Figure 16A:
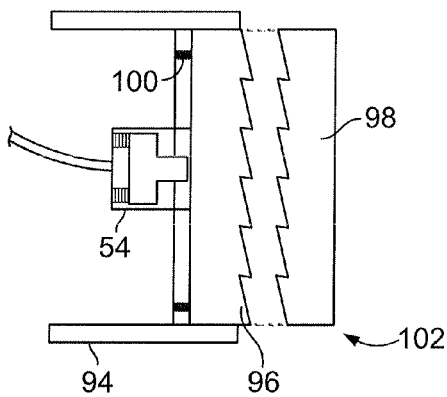
FIGS. 16A and 16B are diagrams of a coast sensor disposed to be operatively responsive to the axial one way clutch of FIG. 13.
Figure 16B:
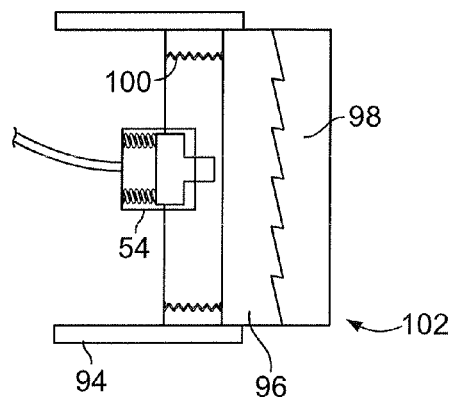

As shown in FIGS. 16A and 16B, the first axial clutch part 98 and the second axial clutch part 96 are biased together by a spring 100, which in one embodiment is positioned in the driver body part 94 of the cassette 90. The sensor 54, which may be a pressure sensor, is disposed in the driver body part 94 in a position to be contacted and actuated when the first axial clutch part 98 and the second axial clutch part 96 are moved apart by a coasting condition.

Figure 17:
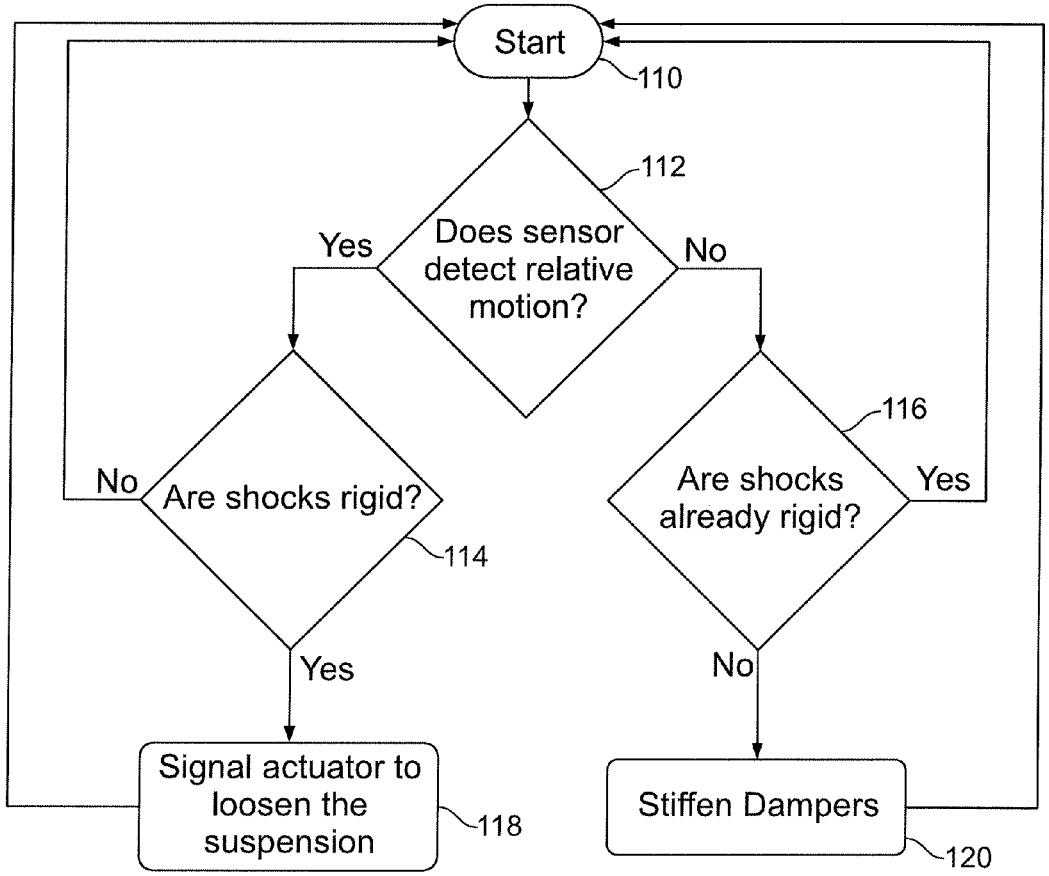
FIG. 17 is a flowchart illustrating one method of operation of the bicycle suspension system according to one embodiment of the invention.
Figure 18:
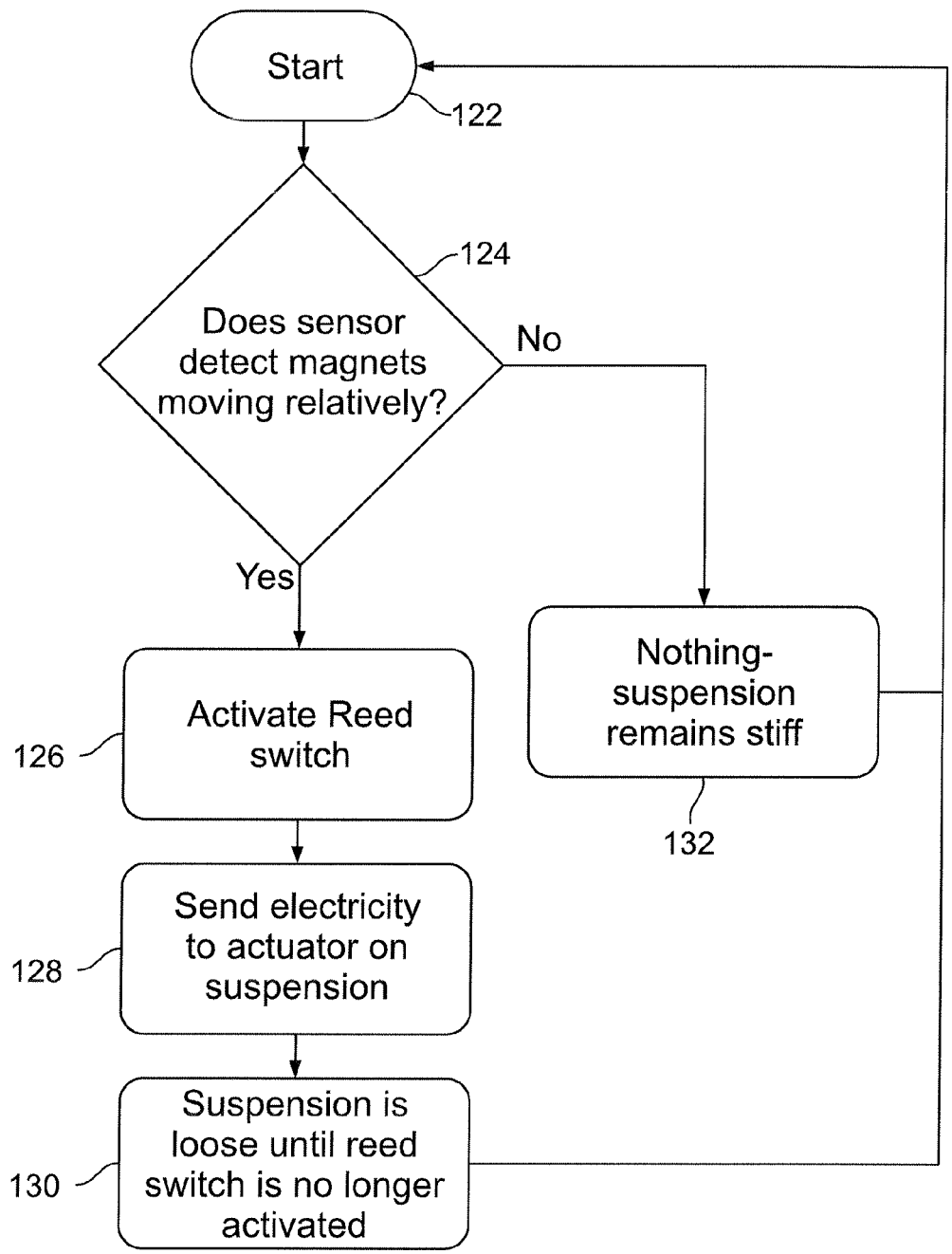
FIG. 18 is a flowchart illustrating another method of operation of the bicycle suspension system.

FIGS. 17 and 18 are flowcharts of different process embodiments of the control system 52. From the start position shown at 110 in FIG. 17, the sensor 54 can be in a state where it is detecting either a coasting or a non-coasting condition and generating a signal to be input into the control unit 56 at 112. If there a coasting condition exists, the sensor 54 generates a signal indicative of coasting. If there is a non-coasting condition, the sensor does not generate a signal indicative of coasting. If the control unit 56 receives an input signal from the sensor 54 indicative of coasting, the control unit determines if the front and rear suspension components 32, 40 are "locked" or stiffened at 114. If the front and rear suspension components 32, 40 are "locked" or stiffened at 114 the control unit 56 generates an output signal instructing the actuators 64 to unlock or unstiffen the front and rear suspension components at 118. Then, the control system 52 returns to the start position 110 to continue to monitor the state of the sensor 54 and so on. If at 114 the front and rear suspension components 32, 40 are not "locked" or stiffened, the system returns to start at 110 to continue to monitor the state of the sensor 54 and so on.

If the control unit 56 receives an input signal from the sensor 54 indicative of non-coasting, the control unit determines if the front and rear suspension components 32, 40 are "locked" or stiffened at 116. If the front and rear suspension components 32, 40 are "locked" or stiffened at 114, then the control system 52 returns to the start position 110 to continue to monitor the state of the sensor 54 and so on. If at 116 the front and rear suspension components 32, 40 are not "locked" or stiffened, then the control unit 56 generates an output signal instructing the actuators 64 to lock or stiffen the front and rear suspension components at 120. Then, the control system 52 returns to the start position 110 to continue to monitor the state of the sensor 54 and so on.

FIG. 18 shows another embodiment of the invention, wherein from the start position shown at 122, the sensor 54 can be in a state where it is detecting either a coasting or non-coasting condition and generating a signal to be input into the control unit 56 at 124. If a coasting condition is detected, the sensor generates an input signal indicating a coasting condition at 126. In response, an output signal is generated by the control unit 56 and sent to an actuator 58 on one or both of the front and rear suspension components at 128. The front and rear suspension components are maintained in a non-stiff or unlocked condition at 130. The process loops back to start at 122 until such a time that the sensor 54 determines that there is a non-coasting condition and at 132 causes one or both of the front and rear suspension components 32, 40 to become stiff. The process loops back to start 122 and so on.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A control system for adjusting suspension settings of a bicycle suspension of a bicycle, comprising:
   a bicycle sensor configured to sense a coasting condition and a non-coasting condition and generate input signals indicative of the sensed condition, and
   a control unit in communication with the bicycle sensor and configured to generate output signals in response to the input signals, the output signals receivable by the bicycle suspension to selectively adjust the suspension settings.

2. The control system of claim 1, wherein the control unit is configured to generate the output signal to adjust the suspension setting so as to one or more of a) unlock the suspension, b) decrease the damping rate of the suspension and c) increase the travel of the suspension, in response to the input signal from the bicycle sensor indicative of the coasting condition.

3. The control system of claim 2, wherein the control unit is configured to generate the output signal to adjust the suspension setting so as to one or more of a) lock the suspension, b) increase the damping rate of the suspension, and c) decrease the travel of the suspension, in response to the input signal from the bicycle sensor indicative of the non-coasting condition.

4. The control system of claim 1, wherein the bicycle sensor is one of a switch, a reed switch, a pressure sensor, a magnetic sensor, an optical sensor, a torque or strain sensor, a hall-effect sensor, and an acoustic sensor.

5. The control system of claim 1, wherein the bicycle sensor has a wired connection to the control unit.

6. The control system of claim 1, wherein the bicycle sensor has a wireless connection to the control unit.

7. The control system of claim 1 further comprising an actuator in communication with the control unit to selectively adjust the suspension settings in response to the output signals from the control unit.

8. The control system of claim 7, wherein the control unit has a first control unit part connected to the bicycle sensor and a second control unit part connected to the actuator.

9. The control system of claim 8, wherein the first control unit part has a wireless connection to the second control unit part.

10. The control system of claim 7, wherein the actuator is a pair of actuators.

11. A control system for adjusting suspension settings on a bicycle suspension of a bicycle, comprising:
   a bicycle sensor configured to sense a coasting condition and a non-coasting condition and generate input signals that are indicative of the sensed condition;
   a control unit in communication with the bicycle sensor, the control unit configured to generate output signals in response to the input signals; and
   one or more actuator in communication with the control unit and operatively connected to the bicycle suspension to selectively adjust the suspension settings in response to the output signals from the control unit.

12. The control system of claim 11, further comprising a wireless transmitter connected to the control unit.

13. The control system of claim 12, further comprising a wireless receiver connected to the actuator for receiving transmissions from the transmitter.

14. The control system of claim 11, wherein the bicycle suspension includes one or more suspension component configured to be coupled between first and second parts of the bicycle that are movable relative to each other in response to a shock applied to the bicycle, the one or more suspension component selectively adjustable between the suspension settings.

15. The control system of claim 14, wherein the one or more actuator is operatively connected to the one or more suspension component to adjust the suspension settings.

16. The control system of claim 14, wherein the one or more suspension component includes a front suspension fork and a rear shock absorber.

17. The control system of claim 16, wherein each of the front suspension fork and the rear shock absorber has respective first and second actuators for selectively adjusting the suspension settings.

18. The control system of claim 11, wherein the suspension setting includes one or more of a damping rate, a state of a lockout feature, and a range of travel of the suspension component.

19. The control system of claim 11, wherein the control unit includes only a single microprocessor.

20. The control system of claim 11, wherein the control unit includes more than one microprocessor.

21. The control system of claim 20, wherein the bicycle sensor is connected to a first microprocessor of the control unit and the one or more actuator is connected to a second microprocessor of the control unit.

22. The control system of claim 11, wherein the sensor is one or more of a switch, a reed switch, a pressure sensor, a magnetic sensor, an optical sensor, a torque or strain sensor, a hall-effect sensor, and an acoustic sensor.

23. The control system of claim 11, wherein the output signal in response to the input signal indicative of the non-coasting condition causes the one or more actuator to one or more of a) lockout the suspension component, b) increase the damping rate of the suspension component, or c) reduce the travel of the suspension component.

24. The control system of claim 23, wherein the output signal in response to the input signal indicative of a coasting condition causes the one or more actuator to one or more of a) unlock the suspension component, b) decrease the damping rate of the suspension component, or c) increase the travel of the suspension component.

25. The control system of claim 11, wherein the bicycle includes a one-way clutch comprising a pawl, and the sensor is configured to sense deflection of the pawl.

26. The control system of claim 25, wherein sensor is configured to sense sound created by motion of the pawl.

27. The control system of claim 11, wherein the bicycle includes a one-way clutch comprising a pair of toothed rings, and the sensor is configured to sense relative motion between the pair of toothed rings.

28. The control system of claim 11, wherein the bicycle includes a rear wheel comprising a rear hub and a cassette rotatably disposed on the hub, and the sensor is configured to sense relative motion between the cassette and hub.

29. The control system of claim 28, wherein the rear wheel includes one or more magnet and the sensor is disposed on the cassette to detect the one or more magnet.

30. A control system for adjusting suspension settings on a bicycle suspension of a bicycle, the bicycle including drivetrain components and a rear wheel hub shell, the control system comprising:
 a bicycle sensor configured to sense relative motion between one of the drivetrain components and the hub shell and generate input signals that are indicative of the relative motion;
 a control unit in communication with the bicycle sensor, the control unit configured to generate output signals in response to the input signals; and
 one or more actuator in communication with the control unit and operatively connected to the bicycle suspension to selectively adjust the suspension settings in response to the output signals from the control unit.

\* \* \* \* \*